United States Patent Office 3,145,364
Patented Aug. 18, 1964

3,145,364
ULTRASONIC SUBMARINE SOUNDING
EQUIPMENTS
Alexandre Boudigues, Paris, France, assignor to Compagnie Generale de Telegraphie Sans Fil, a corporation of France
Filed July 6, 1961, Ser. No. 122,334
Claims priority, application France July 19, 1960
5 Claims. (Cl. 340—3)

The present invention relates to ultrasonic submarine sounding systems and more particularly to such systems as used in fish finding operations for recording the presence of shoals of fish.

Such systems generally comprise a transmitter of short electric pulses, an electro-acoustical transducer which translates the latter into ultrasonic pulses and picks up the echoes reflected by submarine targets to translate them into electric signals, and a receiver for receiving these electric signals.

These signals are generally recorded on a paper tape, travelling at a constant speed, by means of a stylus which moves at a constant speed, perpendicularly to the displacement of the tape and makes a recording upon reception of an echo, i.e. at a distance from the origin of its path which can be readily made proportional to the distance travelled by the ultrasonic signal from the transmitter to the immersed reflecting object.

Generally, a pencil beam of ultrasounds is transmitted in a vertical direction, so that the distance covered is equal to the depth at which the target is located.

The present invention has for its object to provide a submarine sounding device, wherein the ultrasonic beam scans the submarine space in elevation and in bearing and wherein the indicator records on a single support the bearing, the elevation and the true depth of the reflecting targets. This novel display system provides a convenient means for storing the data relative to each survey operation and for exploiting the same.

According to a preferred embodiment of the invention, the recording of the true depth is obtained by relating the displacement of the stylus across the recording tape to the elevation scanning in such a manner that the speed thereof is made proportional to the cosine of the elevation angle.

The invention will be best understood from the following description and appended drawings, wherein.

Figure 1:
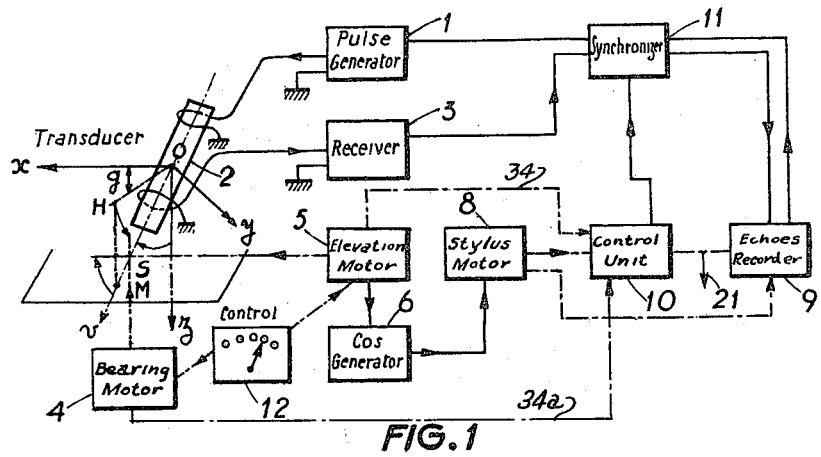
FIG. 1 is a block diagram of a sounding device according to the invention.

In the block diagram of FIG. 1 the electrical connections are indicated by solid lines and the mechanical connections by dash-dotted lines. As shown in the drawing, the system comprises an electrical pulse generator 1; an electro-acoustical transducer 2 which transduces electrical pulses into acoustic pulses, transmits the acoustical pulses, receives the echoes thereof and transduces the echoes received into electrical signals; a receiver 3 receiving these electrical signals; a motor 4 which drives transducer 2 for effecting the scanning in bearing; a motor 5 which drives transducer 2 for effecting the scanning in elevation; a conventional control system 12 for controlling motors 5 and 4; a potentiometer 6 which provides a voltage proportional to the cosine of the elevation angle $s$ and feeds this votlage to a motor 8 for driving the stylus of a recorder 9, the driving being effected through a control unit 10; a synchronizing and switching unit 11 which synchronizes the general operation of the system in a conventional manner.

For the sake of simplicity, it has been assumed in FIG. 1 that the direction $ov$ of the ultrasonic beam coincides with that of the transducer.

Figure 2:
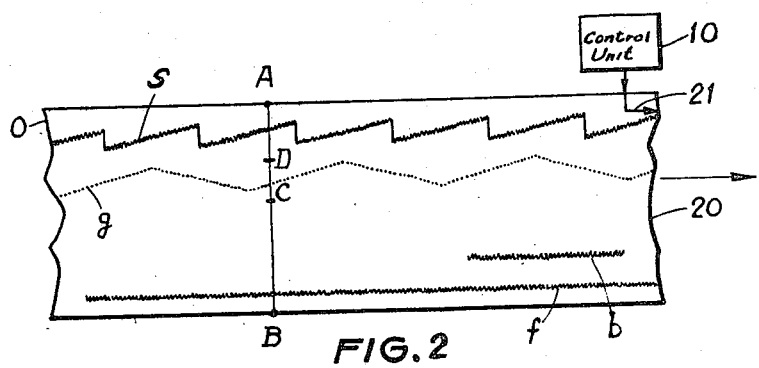
FIG. 2 shows a portion of the tape on which the recording is made.

FIG. 2 illustrates the tape 20 of the recorder. Tape 20 is driven in the direction of the arrow by a suitable tape drive means 50 (FIG. 4), while a stylus 21 is driven perpendicularly to this direction by motor 8 and receives, from recording control unit 10, electric pulses which cause recordings corresponding to the duration of these pulses to be made on tape 20.

In FIG. 2 there are shown the recording $s$ and $g$ resulting from a simultaneous scanning in elevation and bearing. Depth measurements are also recorded at $b$ and $f$.

According to a particular feature of the invention, the same stylus 21 records the curve $s$, which gives at any instant the elevation angle and, the curve $g$ which gives the bearing and echo signals $b$ and $f$, respectively corresponding to the bottom of the sea or to a shoal of fish, the depth thus indicated being the true depth.

The first two recordings are obtained by means of the recording control device 10. The portion of this device which is concerned with the recording of the scanning in elevation is partly shown in more detail in FIG. 3.

A plate 30 is driven by motor 8 at 31 to effect a complete revolution, while stylus 21 is caused to cross the width AB of tape 20, for example, under the action of the same motor 8. Actually, in order to make the recording continuous, during the next revolution of plate 30, another stylus will cross tape 20, while the first stylus returns to its starting position. If necessary, several styli may thus be used to avoid any interruption in the scanning of tape 20. However, for simplifying the description, it will be assumed that a single stylus 21 effects a continuous scanning, reverting instantaneously back to A after having travelled the path AB.

Figure 3:
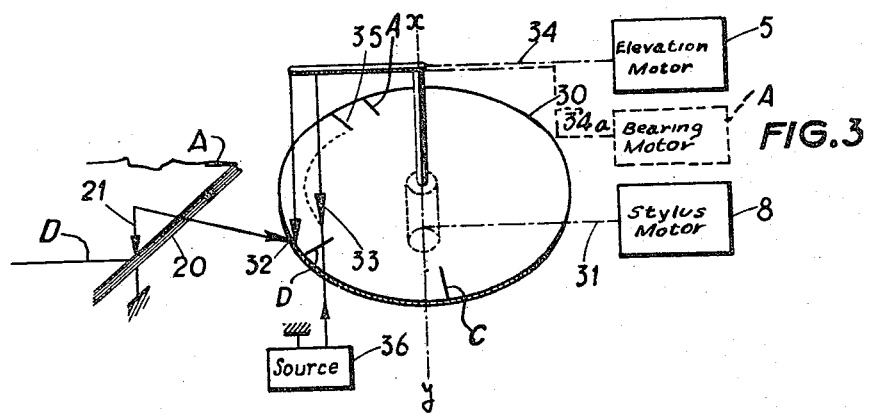
FIG. 3 is a diagrammatic view of the recording equipment.

Two contacts 32, 33 are driven, about the same axis $xy$ as plate 30 and in synchronism with the scanning in elevation, by motor 5 by means of any suitable connection 34. While contacts 32, 33 engage a metallized layer 35 deposited on plate 30, a source 36 is connected through contacts 32 and 33, as shown in FIG. 3, to provide a short electrical discharge between stylus 21 and a metallized layer deposited on the reverse side of tape 20, thus causing a recording to take place. While moving in timed relationship with the scanning in elevation, the shaft, carrying contacts 32, 33 rotates by an arc AD to cover this arc during one scanning cycle and is rapidly returned to point A when point D has been reached. Thus the resulting elevation recordings occupy only a ribbonlike portion of tape 20, i.e. extend over a limited portion AD of the width AB of the tape, as shown in FIG. 2.

A similar plate arrangement is provided for recording the bearing along an adjacent ribbonlike portion DC of tape 20. The contacts corresponding to contacts 32 and 33 which are in this case driven by motor 4 through a connection 34a of the first plate travel during the bearing scanning cycle along an arc DC of the bearing plate 30. The angular position of arc DC is such that, if the two plates 30 were made coaxial, arc DC would be adjacent to arc AD. Thus curve g never interferes with the elevation scanning curve s.

The depth measuring takes place by recording the reflected echoes. The corresponding electrical signals are fed to stylus 21 by the synchronizing and switching circuit 11, as shown in FIG. 4, through a stationary contact 40, for example of the printed circuit type, which cooperates with a movable contact 41 carried by the support 42 of stylus 21.

Figure 4:
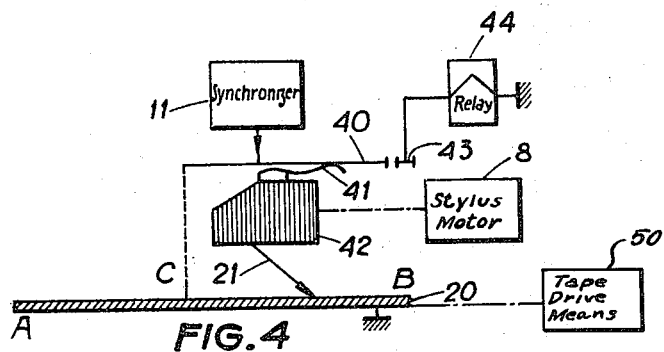
FIG. 4 illustrates the depth recording equipment.

As FIG. 4 shows, the contact 40, which is arranged for receiving the signals corresponding to the echoes for the purpose of depth recording, is arranged in such a manner that echo signals can reach stylus 21 only during time intervals slightly smaller than that corresponding to the stylus path across the width portion CB of tape 20. Another contact 43 actuates, at the end of each travel of contact 41, corresponding to the end of travel AB of stylus 21, a relay 44, which provides a pulse controlling the general synchronization of the system.

It is apparent from the preceding description that the recordings of $s$, $g$, $b$ and $f$ are effected on tape 20 substantially along the same vertical AB, thus making it possible to read simultaneously the elevation and the bearing corresponding to a given depth measurement. This makes the device particularly suitable for sonic fish finding operations.

Figure 5:
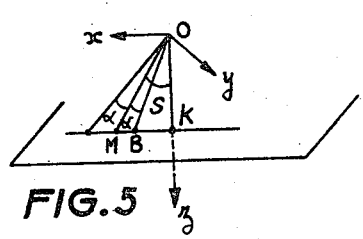
FIG. 5 is a graphic explanation of what may be called the "bottom raising" effect.

As may be readily seen from FIG. 5, the time of propagation, away and back, of the sonic signals is proportional to distance OM as measured in the direction of propagation $ov$, i.e. $MH/\cos s$, where MH is the depth of immersion of the body against which the reflection takes place.

Since according to a particular feature of the invention, the speed of the stylus is made proportional to $\cos s$, its displacement during the time of propagation is proportional to MH and, therefore, the depth recorded is the true depth and not the distance covered by the signal.

A further feature of the invention consists in eliminating the apparent raising of the sea bottom during the scanning.

Due to the fact the acoustic beam, which propagates from O towards M, has a certain width $2\alpha$, as shown in FIG. 5, the first echo picked up by the receiver corresponds to the propagation along the shortest path OB, thus defining a depth $OB \cos s$ which is lower than $OM \cos s$. This "bottom raising" may be eliminated by causing the speed of the stylus to be proportional to $\cos (|s|-\alpha)$ instead of $\cos s$, $|s|$ being the absolute value of the elevation angle.

As to device 6, such systems are well known in the art: for example, a potentiometer may be used, with sine and cosine outputs. In addition, device 6 may be refined in order to take into account the rolling in defining angle $s$.

Another refinement would consist in directly displaying the cartesian coordinates of the echo, by means of a computer which may, for example, comprise rotary potentiometers.

It is to be understood that various modifications may be made in the embodiment described, without departing from the spirit and scope of the invention.

What is claimed is:

1. An ultrasonic sounder comprising means for transmitting sonic signals, means for receiving echoes of said signals, means for scanning a predetermined area in elevation and in bearing by means of said signals, a single recording tape and stylus means for recording on said tape said elevation and bearing, and said echoes, means for driving said stylus along a path transversal to said tape at a speed proportional to the cosine of the elevation angle; and means for energizing said stylus in synchronism with said scanning elevation and said scanning in bearing respectively during its successive travels through a first and a second portion of said path and for applying thereto said echoes during its successive travels through the remainder of said path.

2. An ultrasonic sounder comprising means for transmitting a beam of sonic signals, means for receiving echoes of said signals, means for scanning a predetermined area in elevation and in bearing by means of said signals, a recording tape and stylus means for recording on said tape said elevation and bearing, and said echoes, means for driving said stylus along a path transversal to said tape at a speed proportional to the cosine of the elevation angle; and means for energizing said stylus in synchronism with said scanning in elevation and said scanning in bearing respectively durig it successive travels through a first and a second portion of said path and for applying thereto said echoes during its successive travels through the remainder of said path.

3. An ultrasonic sounder comprising: means for transmitting a beam of sonic signals; means for receiving echoes of such signals; first means for scanning a predetermined area in elevation and second means for scanning it in bearing by means of said signals; a recording tape and stylus means for recording said elevation and bearing for driving said tape; means for periodically displacing said stylus means at a speed proportional to the cosine of the elevation angle along paths directed transversally of said tape; respective means timed with said first and second means for applying to said stylus during a first portion of said paths one signal indicating the elevation of said beam and during a second portion of said paths, one signal indicating the bearing of said beam; and further means for applying to said stylus during the remainder of said paths the echoes reflected during said path; means for making said respective and said further means operative in succession in order for the corresponding recordings to take place on said tape along separate adjacent ribbonlike portions thereof.

4. An ultrasonic sounder comprising: means for transmitting a beam of sonic signals; means for receiving echoes of such signals; first means for scanning a predetermined area in elevation and second means for scanning it in bearing by means of said signals; a recording tape and stylus means for recording thereon said elevation and bearing and said echoes; means for driving said tape; means for periodically displacing said stylus means at a speed proportional to the cosine of the elevation angle along paths directed transversally of said tape; respective means for applying to said stylus during a first portion of each of said paths one signal indicating the elevation of said beam and during a second portion of each of said paths one signal indicating the bearing of said beam, said respective means comprising means for energizing said stylus means and respective contact means movable in respective synchronism with said scannings in elevation and in bearing for controlling said energizing means; and further means for actuating said stylus under the action of received echoes during its travel across the remaining width portion of said tape.

5. An ultrasonic sounder comprising: means for transmitting a beam of sonic signals; means for receiving echoes of such signals; first means for scanning a predetermined area in elevation and second means for scanning it in bearing by means of said signals; a recording tape and stylus means for recording thereon said elevation and bearing and said echoes; means for driving said tape; means for periodically displacing said stylus means at a speed proportional to the cosine of the elevation angle along paths directed transversally of said tape; respective means for applying to said stylus during a first width portion of each of said paths one signal indicating the elevation of said beam and during a second width portion of each of said paths, one signal indicating the bearing of said beam, said respective means respectively comprising a disc, rotatable in synchronism with said stylus and carrying a fixed contact, contacts arranged for cooperating with said fixed contact and movable in synchronism with the corresponding scanning, a circuit for energizing said stylus, said circuit comprising said cooperating contacts, the relative rest positions of said contacts being such that the energization of said stylus takes place respectively during its travel along said first and second width portion of said tape; and means for energizing said stylus under the action of received echoes during travel across the remaining width portion of said tape.

References Cited in the file of this patent

UNITED STATES PATENTS

| | | |
|---|---|---|
| 2,225,046 | Hunter | Dec. 17, 1940 |
| 2,477,050 | Dyson | July 26, 1949 |
| 2,703,397 | Ruble | Mar. 1, 1955 |
| 2,759,783 | Ross | Aug. 21, 1956 |